United States Patent
Hooton

(10) Patent No.: US 8,555,552 B2
(45) Date of Patent: Oct. 15, 2013

(54) INFLATABLE DOOR SEAL

(75) Inventor: Joel S. Hooton, Chesterfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 27 days.

(21) Appl. No.: 13/216,549

(22) Filed: Aug. 24, 2011

(65) Prior Publication Data

US 2013/0047519 A1 Feb. 28, 2013

(51) Int. Cl.
*B60J 10/08* (2006.01)

(52) U.S. Cl.
USPC ...................................... 49/477.1; 296/146.9

(58) Field of Classification Search
USPC ...................... 49/477.1, 460, 503; 296/146.9; 277/605, 644–646
See application file for complete search history.

(56) References Cited

U.S. PATENT DOCUMENTS

| | | | | |
|---|---|---|---|---|
| 2,306,990 A * | 12/1942 | Essl | ................................ | 105/35 |
| 2,530,160 A * | 11/1950 | Finley | .......................... | 49/477.1 |
| 2,700,196 A * | 1/1955 | Panhard | .................... | 52/204.597 |
| 2,704,387 A * | 3/1955 | Clay et al. | .................... | 49/477.1 |
| 2,860,911 A * | 11/1958 | Cotter | ........................... | 296/202 |
| 3,161,229 A * | 12/1964 | Sanders | .......................... | 160/40 |
| 3,178,779 A * | 4/1965 | Clark et al. | .................... | 277/646 |
| 3,580,629 A * | 5/1971 | Heim | ............................ | 296/212 |
| 4,370,831 A * | 2/1983 | Hamilton | ..................... | 49/477.1 |
| 4,371,175 A * | 2/1983 | Van Dyk, Jr. | ................. | 174/357 |
| 4,375,104 A * | 2/1983 | Starr et al. | .................... | 376/203 |
| 4,399,317 A * | 8/1983 | Van Dyk, Jr. | ................. | 174/364 |
| 4,813,184 A * | 3/1989 | Weimar | ....................... | 49/477.1 |
| 4,924,629 A * | 5/1990 | Smith et al. | ................... | 49/477.1 |
| 4,989,369 A * | 2/1991 | Maass | .......................... | 49/477.1 |
| 5,012,615 A * | 5/1991 | Piccinini et al. | ............. | 49/477.1 |
| 5,046,285 A * | 9/1991 | Fratini et al. | ................. | 49/477.1 |
| 5,079,873 A * | 1/1992 | Smith | .......................... | 49/477.1 |
| 5,085,293 A * | 2/1992 | Aime | ............................ | 187/400 |
| 5,090,765 A * | 2/1992 | Gremillion | ................ | 296/180.1 |
| 5,181,341 A * | 1/1993 | Keys et al. | .................... | 49/477.1 |
| 5,253,453 A * | 10/1993 | Maass et al. | .................... | 49/377 |
| 5,339,488 A * | 8/1994 | Maass | ........................ | 15/250.01 |
| 5,361,542 A * | 11/1994 | Dettloff | ....................... | 49/477.1 |
| 5,452,550 A * | 9/1995 | Vanesky et al. | .............. | 52/173.1 |
| 5,469,667 A * | 11/1995 | Le Marrec | .................... | 49/477.1 |
| 5,489,104 A * | 2/1996 | Wolff | ............................ | 277/646 |
| 5,870,860 A * | 2/1999 | Heller | .......................... | 49/477.1 |
| 6,098,992 A * | 8/2000 | Long et al. | ..................... | 277/637 |
| 6,125,591 A * | 10/2000 | Schmidhuber et al. | ....... | 49/477.1 |
| 6,694,676 B2 * | 2/2004 | Sakamoto et al. | .............. | 49/366 |
| 6,846,034 B1 * | 1/2005 | Angus et al. | ............... | 296/146.9 |
| 6,848,737 B2 * | 2/2005 | Mikolai et al. | ............. | 296/146.9 |
| 6,922,945 B2 * | 8/2005 | Dron | ............................ | 49/477.1 |

(Continued)

*Primary Examiner* — Katherine Mitchell
*Assistant Examiner* — Justin Rephann

(57) ABSTRACT

A vehicle and method of operation having a first door, a second door, an inflatable door seal assembly and an inflator assembly. The first door has a first opening side and a first seal mount extending along the first opening side. The second door has a second opening side adjacent to the first opening side to define a gap and a second seal mount extending along the second opening side. The door seal assembly has a first seal assembly mounted to one of the first or second seal mounts, the first seal assembly inflatable to extend into the gap toward the other of the seal mounts when the first and second door are closed and deflatable to retract from the gap. The inflator assembly pumps a fluid into the seal assembly to inflate the seal assembly and pumps the fluid out to deflate the seal assembly.

11 Claims, 3 Drawing Sheets

(56) References Cited

U.S. PATENT DOCUMENTS

| | | | |
|---|---|---|---|
| 8,123,278 B1 * | 2/2012 | McKenney et al. | 296/146.9 |
| 8,196,992 B2 * | 6/2012 | Konchan et al. | 296/146.9 |
| 8,328,268 B2 * | 12/2012 | Charnesky et al. | 296/146.9 |
| 8,328,269 B2 * | 12/2012 | Krajenke | 296/146.9 |
| 2006/0010779 A1 * | 1/2006 | Schlachter et al. | 49/477.1 |
| 2006/0249982 A1 * | 11/2006 | Frohne-Brinkmann | 296/146.9 |
| 2009/0255187 A1 * | 10/2009 | Alexander et al. | 49/477.1 |
| 2010/0132264 A1 * | 6/2010 | Campbell et al. | 49/477.1 |
| 2012/0133175 A1 * | 5/2012 | Charnesky et al. | 296/146.4 |
| 2012/0153678 A1 * | 6/2012 | Konchan et al. | 296/202 |
| 2013/0025211 A1 * | 1/2013 | Zaccaria et al. | 49/498.1 |

\* cited by examiner

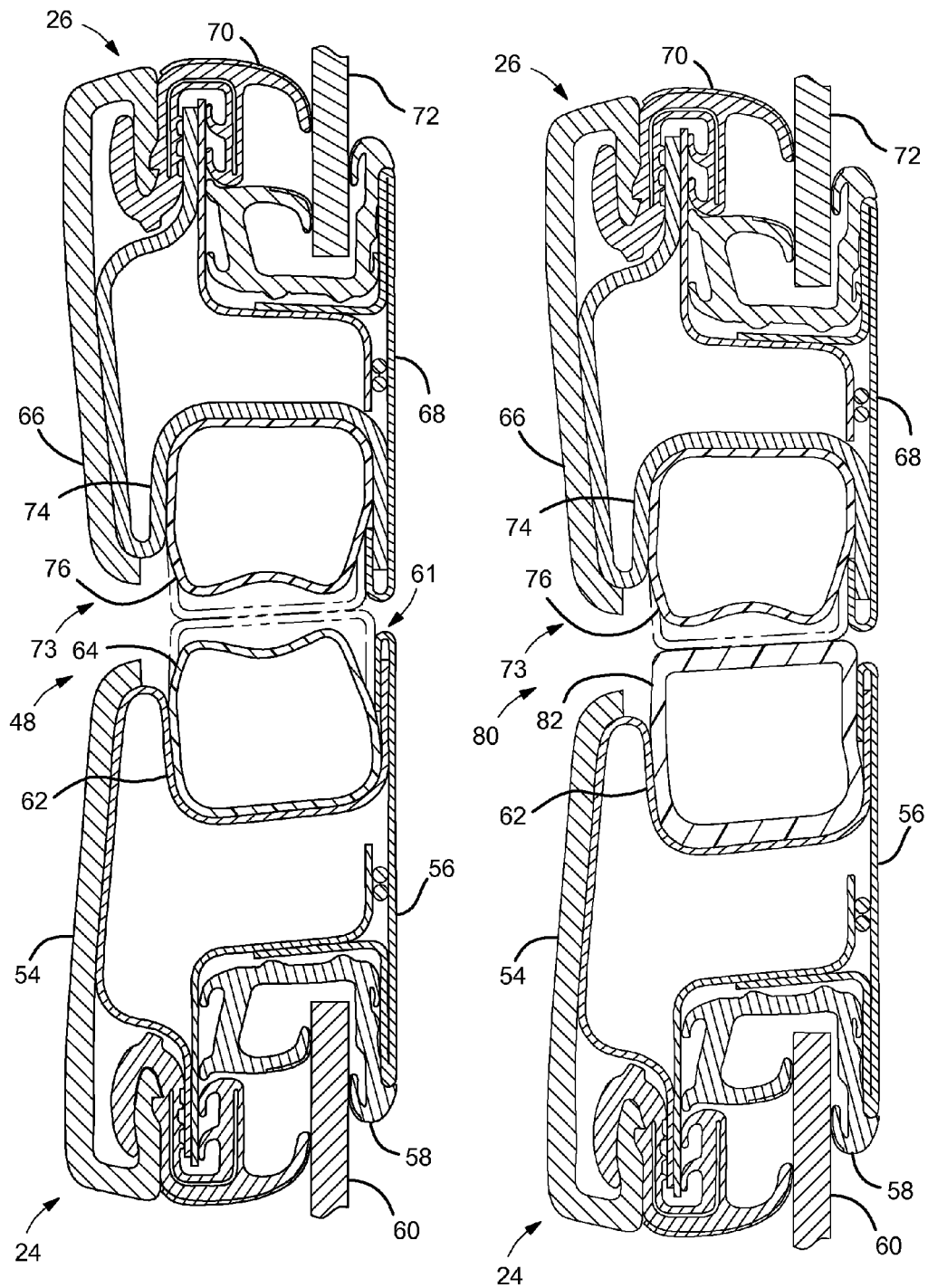

INFLATABLE DOOR SEAL

BACKGROUND OF INVENTION

The present invention relates generally to seals for doors and more particularly to seals between doors that are inflatable and deflatable to allow for sealing when closed as well as door opening without door seal interference.

Some vehicles have door arrangements where two doors are mounted side by side and both open by pivoting away from each other (i.e., the hinges are on the sides opposite from the opposed door). This arrangement is sometimes used, for example, in extended cab pickup trucks where the front door pivots forward and a smaller rear door of the extended cab pivots backwards—without an B-pillar between the two doors. For such door arrangements, there needs to be a gap between the two doors in order to allow them to swing from open to closed without hitting each other. This gap, however, needs to be effectively sealed to prevent water and noise from entering the vehicle while the doors are closed since there is no B-pillar to seal each door against. Fixed seals have been used for sealing in the gap between the doors, but they require hard parts of the door and body to be close together to allow for effective sealing.

This arrangement, then, typically requires that the two doors cannot both be opened independently of the other door, while still providing effective sealing. For a typical vehicle, the front door must be opened first, then the second can be opened. This allows for two surfaces between which the fixed seals can be located.

SUMMARY OF INVENTION

An embodiment contemplates a vehicle having a first door, a second door, an inflatable door seal assembly and an inflator assembly. The first door has a first opening side, an opposed first hinge side pivotally supported by the vehicle and a first seal mount extending along at least a portion of the first opening side. The second door has a second opening side adjacent to the first opening side to define a gap therebetween, an opposed second hinge side pivotally supported by the vehicle and a second seal mount extending along at least a portion of the second opening side. The inflatable door seal assembly has a first seal assembly mounted to one of the first or second seal mounts, the first seal assembly configured to be inflatable to extend into the gap toward the other of the first or second seal mounts when the first and second door are closed and deflatable to retract from the gap. The inflator assembly is configured to pump a fluid into the first seal assembly to inflate the first seal assembly and pump the fluid out of the first seal assembly to deflate the first seal assembly.

An embodiment contemplates a method of sealing a gap between a first opening side of a first door and an adjacent second opening side of a second door on a vehicle, the method comprising the steps of: detecting that the first and second doors are closed; inflating a first seal assembly mounted on one of the first and second opening sides to cause the first seal assembly to expand into the gap when the first and second doors are detected as closed; detecting that opening of at least one of the first and second doors is imminent; and when opening is detected as imminent, deflating the first seal assembly to cause it to retract.

An advantage of an embodiment is that good door sealing, even with gap variations between vehicles, can be achieved, while still maintaining a desirable low effort for door opening and closing. The seal can be deflated prior to initial door opening movement, which decreases the effort to pull the door open, and the seal can be inflated after the door is fully closed, thus decreasing door closing effort. While the door remains closed, the seals can remain inflated and in contact to assure a good seal between the doors, while not interfering with each other as the doors pivot between open and closed positions. Also, metal attachment surfaces on each door do not need to be as close to each other as compared to doors with fixed size seals. In addition, the number of moving parts can be minimized since inflation/deflation of the seals accomplishes the desired goal. Moreover, inflatable seals may be used to allow for increasing or decreasing the opening and closing efforts by adjusting when and by how much the seals are inflated.

This type of inflatable seal arrangement may also allow for each door to be opened independently from the other, while still allowing for sealing between the two doors.

BRIEF DESCRIPTION OF DRAWINGS

FIG. 2 is a cross section along line 2-2 in FIG. 1, rotated ninety degrees counter clockwise.

FIG. 3 is a view similar to FIG. 2, but illustrating a second embodiment.

DETAILED DESCRIPTION

Figure 1:
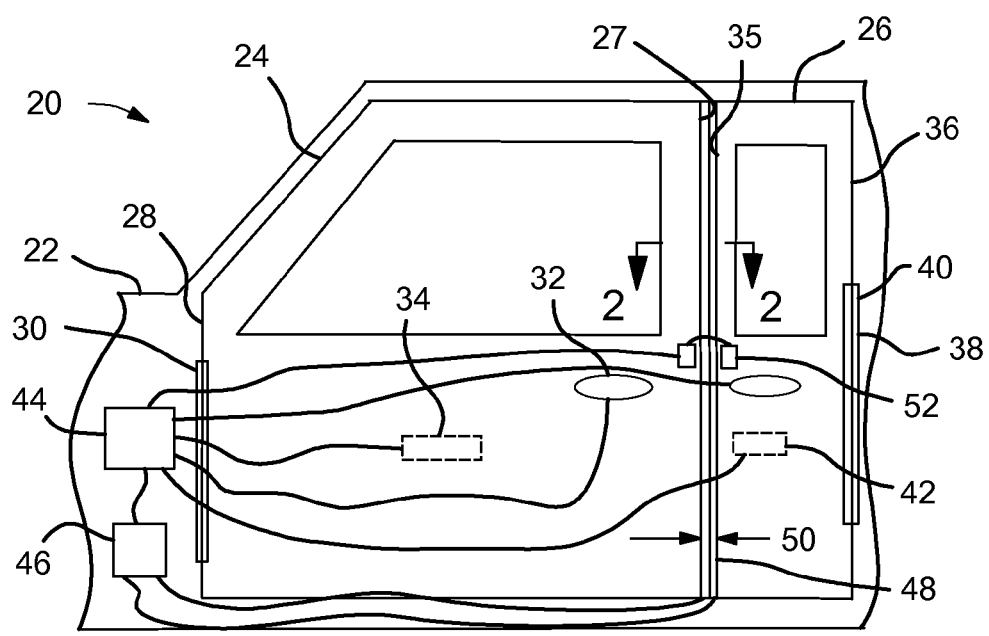
FIG. 1 is a schematic view of a portion of a side of a vehicle.

Referring to FIG. 1, a vehicle, indicated generally at 20, is shown. The vehicle 20 includes a body 22 to which a front door 24 and a rear door 26 are mounted adjacent to each other. The front door 24 has an opening side 27 and a hinge side 28, which connects to the vehicle body 22 via a front hinge assembly 30 to allow for pivoting of the front door 24 between open and closed positions. The front door 24 also includes an outside door handle 32 and an inside door handle 34, which are user operable to unlatch the front door 24. The term opening side, as used herein, means the side of the door opposite the hinge that swings out when the door is opened, while the term hinge side refers to the side of the door that has the hinge attached thereto and pivots about this hinge.

The rear door 26 has an opening side 35 and a hinge side 36, in opposed relation to the hinge side 28 of the front door 24. This hinge side 32 connects to the vehicle body 22 via a rear hinge assembly 38 to allow for pivoting of the rear door 26 between open and closed positions. The rear door 26, if configured to open independently of the front door 24, may include an outside door handle 40 and an inside door handle 42, which are user operable to unlatch the rear door 26. If it is not desired to allow for opening of the rear door 26 independently of the front door 24, then there may be just one door handle (not specifically shown) that allows for unlatching of the rear door 26 after the front door 24 has been opened.

The door handles 32, 34, 40, 42 may be in communication with a controller 44, which may be, for example, a body controller. The controller 44 may take various forms of hardware and software as are known to those skilled in the art. Also, door closed sensors 52 may be employed to detect when the doors 24, 26 are closed. These sensors 52 may detect door latches being in their closed positions or may detect the actual door positions by use of, for example, a contact type of switch. The door closed sensors 52 may be in communication with the controller 44. The controller 44 may also be in communication with an inflator assembly 46.

The inflator assembly 46 may employ, for example, a compressor or a single stroke pump. The compressor may be a reciprocating air pump that is activated to pump air (or other fluid) into or out of the inflatable door seal assembly 48. The single stroke pump may employ a cylinder containing a volume of air (or other fluid) that, when compressed, inflates the seal assembly 48, and when expanded, draws air out of the seal—similar in operation to a large syringe. Other types of fluid pumping or compressing mechanisms may be employed instead for the inflator assembly 46, if so desired.

The inflator assembly 46 is in fluid communication with an inflatable door seal assembly 48. The inflatable door seal assembly 48 mounts to the opening sides 27, 35 of the doors 24, 26 and is inflatable to fill and seal a gap 50 between the two doors 24, 26 when in their closed positions.

FIG. 2 illustrates an embodiment of the inflatable door seal assembly 48 and a portion of the doors 24, 26 in more detail. The front door 24 includes a door outer panel 54 secured to a door inner panel 56, with seals 58 for a window 60 secured thereon. The door 24 includes a front seal assembly 61 having a seal mount, such as a seal pocket 62, within which is mounted a front primary seal 64. This front primary seal 64 is in fluid communication with the inflator assembly 46 (FIG. 1) so that it can be inflated and deflated, as desired. The solid lines in FIG. 2 show the front primary seal 64 in its deflated position, while the phantom lines show the seal 64 in its inflated position.

The rear door 26 includes a door outer panel 66 secured to a door inner panel 68, with the seals 70 for a window 72 secured thereon. The door 26 includes a rear seal assembly 73 having a seal mount, such as a seal pocket 74, within which is mounted a rear primary seal 76. This rear primary seal 76 is in fluid communication with the inflator assembly 46 (FIG. 1) so that it can be inflated and deflated, as desired. The solid lines in FIG. 2 show the rear primary seal 76 in its deflated position, while the phantom lines show the seal 76 in its inflated position pressed against the front primary seal 64.

The operation of the inflatable door seal assembly 48 will now be discussed with reference to FIGS. 1 and 2. When the front and rear doors 24, 26 are closed, the inflator assembly 46 fills the front and rear primary seals 64, 76 with a fluid, such as air, which causes the seals 64, 76 to expand into contact with each other. This fills the gap 50 between the opening sides 27, 35 of the doors 24, 26, sealing out moisture and reducing noise entering the vehicle. The inflated seals 64, 76 ensure that the gap 50 is filled, even if the gap 50 varies somewhat from one vehicle to the next.

The trigger for deflation of the primary seals 64, 76 may be based on different factors and timing, as is desired. One example of triggers used to cause the deflation may be when movement of one of the door handles 32, 34, 40, 42 is initiated. That is, when a person begins to pull on one of the door handles, the particular handle sends a signal to the controller 44, which, in turn, causes the inflator assembly 46 to immediately begin deflating the primary seals 64, 76. Thus, by the time the particular door handle is pulled far enough to cause the corresponding door to unlatch and the person begins to pivot the door open, the primary seals 64, 76 have deflated sufficiently to avoid interfering with the smooth opening of the door. For some modern doors without an outside door handle, where a key fob or key card may electronically initiate door unlatching, the inflator assembly 46 may be initiated just before or at about the same time as the electronic door unlatching mechanism to allow for smooth opening of the door.

After both doors 24, 26 are closed, the controller 44 may cause the inflator assembly 46 to transfer fluid into the primary seals 64, 76, inflating the seals 64, 76 to again fill and seal the gap 50 between the two doors 24, 26. The controller 44 may detect closure of both doors 24, 26 by receiving signals from the door closed sensors 52. Thus, the inflatable door seal assembly 48 allows for independent opening of the front and rear doors 24, 26 while still assuring a good seal in the gap 50 between the doors 24, 25.

FIG. 3 illustrates a second embodiment of the inflatable door seal assembly 80 that may be employed with the vehicle 20 of FIG. 1. This embodiment is similar to the first embodiment and so like reference numbers designate corresponding parts in the drawings and detailed description thereof will be omitted.

In this embodiment, the door structure may be essentially the same. Also, the rear primary seal 76 and its fluid connection to the inflator assembly 46 may be the same. The difference is with the front primary seal 82, which is no longer an inflatable/deflatable seal. This seal 82 is now a generally fixed block of material, which the rear primary seal 76 seals against when it is inflated (shown in phantom lines in FIG. 3), and which the rear primary seal 76 separates from when it is deflated (shown in solid lines in FIG. 3). Accordingly, there is no fluid communication line between the inflator assembly 46 and the front primary seal 82.

The operation of the inflatable door seal assembly 80 can be essentially the same as with the first embodiment. With one seal now essentially stationary, less inflation capability is needed, but this may reduce somewhat the amount of gap that can be sealed between the two doors 24, 26. Alternatively, the rear primary seal may be stationary while the front primary seal is the inflatable one.

Figures 4, 5:
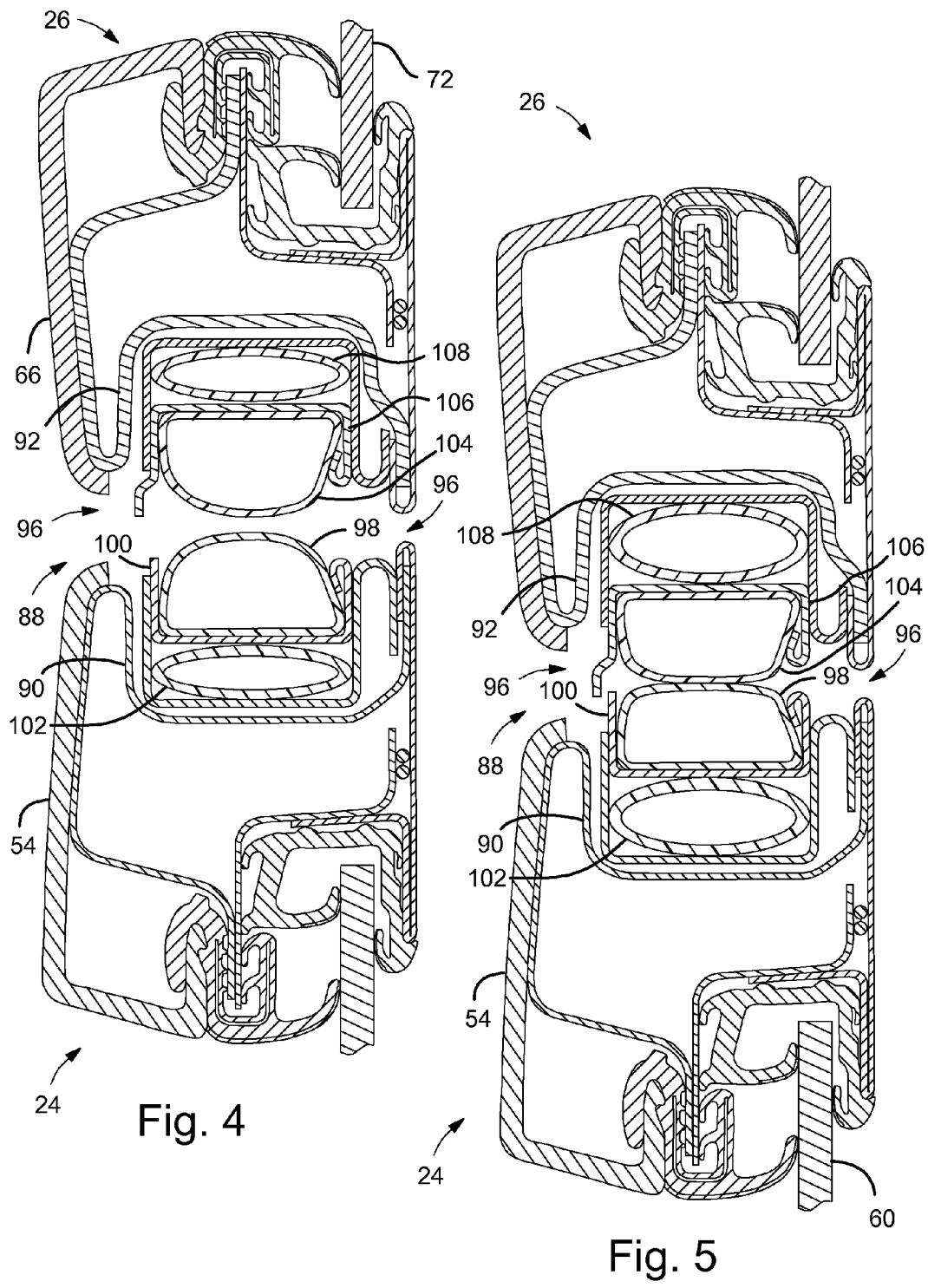
FIG. 4 is a view similar to FIG. 2, but illustrating a third embodiment.
FIG. 5 is a view similar to FIG. 4, but with the seal assemblies in the inflated positions.

FIGS. 4 and 5 illustrate a third embodiment of the inflatable door seal assembly 88 that may be employed with the vehicle 20 of FIG. 1. This embodiment is similar to the first embodiment and so like reference numbers designate corresponding parts in the drawings and detailed description thereof will be omitted.

In this embodiment, the structure of the doors 24, 26 may be essentially the same except for the front seal pocket 90 and the rear seal pocket 92. Also, the front seal assembly 94 and rear seal assembly 96 have changed. The front seal assembly 94 includes a front primary seal 98 that is mounted in a front seal carrier channel 100, which is telescopically slidable toward and away from the rear seal assembly 96. Between the front seal carrier channel 100 and the front seal pocket 90 is a front inflator seal 102, which is attached to the front seal carrier channel 100. The front inflator seal 102 is in fluid communication with the inflator assembly 46 (FIG. 1).

The rear seal assembly 96 includes a rear primary seal 104 that is mounted in a rear seal carrier channel 106, which is telescopically slidable toward and away from the front seal assembly 94. Between the rear seal carrier channel 106 and the rear seal pocket 92 is a rear inflator seal 108, which is attached to the rear seal carrier channel 106. The rear inflator seal 108 is in fluid communication with the inflator assembly 46 (FIG. 1).

The operation of this embodiment will now be discussed with reference to FIGS. 1, 4 and 5. The triggers for when to inflate and deflate the seal assemblies 94, 96 may be the same as the first embodiment, but the movement of the seals themselves is somewhat different. When the doors are open or in the process of being opened, the door seal assemblies 94, 96 are in the deflated position shown in FIG. 4, while when the doors are closed and sealed, the door seal assemblies 94, 96 are in the inflated position shown in FIG. 5.

To move from the deflated position to the inflated position, the controller 44 activates the inflator assembly 46, which pumps fluid, such as air, into the front and rear inflator seals 102, 108. As the fluid is pumped into the inflator seals 102, 108, the inflator seals 102, 108 push the front seal carrier channel 100 and the rear seal carrier channel 106 toward each other. This in turn pushes the front primary seal 98 into contact with the rear primary seal 104, thus sealing the gap 50 between the doors 24, 26.

To deflate the seal assemblies 94, 96, the fluid is pulled from the inflator seals 102, 108, which pulls the carrier channels 100, 106 and hence the primary seals 98, 104 away from each other.

The carrier channels 100, 106 help protect the inflator seals 102, 108 from possible puncture or other damage and may also overlap each other in the inflated positions to better secure the gap 50 from intrusion from someone, for example, attempting to gain entry into the vehicle without a key.

Alternatively, the third embodiment may also have one fixed position seal and one seal moved into contact due to inflation, similar to the second embodiment. Again, while two movable seals require more inflation and deflation ability, they may allow for filling and sealing a larger gap. Also, one may employ a seal assembly like the first embodiment on one door and a seal assembly like the third embodiment on the other door if so desired.

While certain embodiments of the present invention have been described in detail, those familiar with the art to which this invention relates will recognize various alternative designs and embodiments for practicing the invention as defined by the following claims.

What is claimed is:

1. A vehicle comprising:
   a first door having a first opening side, an opposed first hinge side pivotally supported by the vehicle and a first seal mount extending along at least a portion of the first opening side;
   a second door having a second opening side adjacent to the first opening side to define a gap therebetween, an opposed second hinge side pivotally supported by the vehicle and a second seal mount extending along at least a portion of the second opening side;
   an inflatable door seal assembly having a first seal assembly mounted to one of the first or second seal mounts, the first seal assembly configured to be inflatable to extend into the gap toward the other of the first or second seal mounts when the first and second door are closed and deflatable to retract from the gap; and
   an inflator assembly configured to pump a fluid into the first seal assembly to inflate the first seal assembly and pump the fluid out of the first seal assembly to deflate the first seal assembly; and
   wherein the first seal assembly includes a first inflator seal mounted to the first seal mount and configured to operatively engage the inflator assembly to be selectively inflated and deflated, a first carrier channel mounted to the first inflator seal and configured to be telescopically slidable toward and away from the gap by the inflation and deflation, respectively, of the first inflator seal, and a first primary seal mounted to the first carrier channel and configured to be slidable toward and away from the gap.

2. The vehicle of claim 1 wherein the inflatable door seal assembly includes a second seal assembly mounted to the other of the first or second seal mounts and configured to selectively seal against the first seal assembly to seal the gap.

3. The vehicle of claim 2 wherein the second seal assembly is a fixed seal.

4. The vehicle of claim 2 wherein the second seal assembly is configured to be inflatable to extend into the gap toward the first seal assembly, and the inflator assembly is configured to pump the fluid into the second seal assembly to inflate the second seal assembly and pump the fluid out of the second seal assembly to deflate the second seal assembly.

5. The vehicle of claim 2 wherein the second seal mount is a second seal pocket and the second seal assembly is secured in the second seal pocket.

6. The vehicle of claim 2 wherein the second seal assembly includes a second inflator seal mounted to the second seal mount and configured to operatively engage the inflator assembly to be selectively inflated and deflated, a second carrier channel mounted to the first inflator seal and configured to be telescopically slidable toward and away from the gap by the inflation and deflation, respectively of the second inflator seal, and a second primary seal mounted to the second carrier channel and configured to be slidable toward and away from the gap and selectively engage the first seal assembly.

7. The vehicle of claim 2 including a controller in communication with the inflator assembly, and wherein the first door includes a first door handle in communication with the controller, and the second door includes a second door handle in communication with the controller.

8. The vehicle of claim 7 including a first door closed sensor in communication with the first door and configured to communicate with the controller that the first door is in a closed position, and a second door closed sensor in communication with the second door and configured to communicate with the controller that the second door is in a closed position.

9. The vehicle of claim 1 including a controller in communication with the inflator assembly, and wherein the first door includes a door handle in communication with the controller.

10. The vehicle of claim 9 including a first door closed sensor in communication with the first door and configured to communicate with the controller that the first door is in a closed position.

11. A vehicle comprising:
    a first door having a first opening side, an opposed first hinge side pivotally supported by the vehicle and a first seal mount extending along at least a portion of the first opening side;
    a second door having a second opening side adjacent to the first opening side to define a gap therebetween, an opposed second hinge side pivotally supported by the vehicle and a second seal mount extending along at least a portion of the second opening side;
    an inflatable door seal assembly having a first seal assembly mounted to one of the first or second seal mounts, the first seal assembly configured to be inflatable to extend into the gap toward the other of the first or second seal mounts when the first and second door are closed and deflatable to retract from the gap; and
    an inflator assembly configured to pump a fluid into the first seal assembly to inflate the first seal assembly and pump the fluid out of the first seal assembly to deflate the first seal assembly;
    wherein the inflatable door seal assembly includes a second seal assembly mounted to the other of the first or second seal mounts and configured to selectively seal against the first seal assembly to seal the gap; and
    wherein the first seal assembly includes a first inflator seal mounted to the first seal mount and configured to operatively engage the inflator assembly to be selectively inflated and deflated, a first carrier channel mounted to the first inflator seal and configured to be telescopically slidable toward and away from the gap by the inflation and deflation, respectively, of the first inflator seal, and a first primary seal mounted to the first carrier channel and configured to be slidable toward and away from the gap and selectively engage the second seal assembly; and the second seal assembly includes a second inflator seal mounted to the second seal mount and configured to operatively engage the inflator assembly to be selectively inflated and deflated, a second carrier channel mounted to the first inflator seal and configured to be telescopically slidable toward and away from the gap by the inflation and deflation, respectively of the second inflator seal, and a second primary seal mounted to the second carrier channel and configured to be slidable toward and away from the gap and selectively engage the first seal assembly.

* * * * *